US012560474B2

(12) United States Patent
　　Kamada

(10) Patent No.: US 12,560,474 B2
(45) Date of Patent: Feb. 24, 2026

(54) LAID STATE IDENTIFYING SYSTEM, LAID STATE IDENTIFYING APPARATUS, AND LAID STATE IDENTIFYING METHOD

(71) Applicant: NEC Corporation, Tokyo (JP)

(72) Inventor: Shinya Kamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 315 days.

(21) Appl. No.: 18/289,146

(22) PCT Filed: May 13, 2021

(86) PCT No.: PCT/JP2021/018204
§ 371 (c)(1),
(2) Date: Nov. 1, 2023

(87) PCT Pub. No.: WO2022/239184
PCT Pub. Date: Nov. 17, 2022

(65) Prior Publication Data
US 2024/0219226 A1　　Jul. 4, 2024

(51) Int. Cl.
　G01H 9/00　　(2006.01)
　G01D 5/353　　(2006.01)
　G08G 1/00　　(2006.01)
　G08G 1/017　　(2006.01)

(52) U.S. Cl.
　CPC ......... G01H 9/004 (2013.01); G01D 5/35358 (2013.01); G08G 1/017 (2013.01); G08G 1/20 (2013.01)

(58) Field of Classification Search
　CPC ............................... G01H 9/004; G01H 9/006
　See application file for complete search history.

(56) References Cited

U.S. PATENT DOCUMENTS

| | | | | |
|---|---|---|---|---|
| 11,802,810 | B2 * | 10/2023 | Xia | G01M 7/00 |
| 12,411,040 | B2 * | 9/2025 | Matsuda | G01B 11/00 |
| 2016/0275788 | A1 | 9/2016 | Wu et al. | |

FOREIGN PATENT DOCUMENTS

| | | | |
|---|---|---|---|
| JP | 2003-229823 | A | 8/2003 |
| JP | 2019-529952 | A | 10/2019 |
| JP | 2019-537721 | A | 12/2019 |

OTHER PUBLICATIONS

International Search Report for PCT Application No. PCT/JP2021/018204, mailed on Jul. 20, 2021.

* cited by examiner

*Primary Examiner* — Erika J. Villaluna
(74) *Attorney, Agent, or Firm* — Sughrue Mion, PLLC

(57)　　　ABSTRACT

A laid state identifying system (1) according to the present disclosure includes: an optical fiber (10) laid in a road (30) and configured to detect vibration generated by traveling of a vehicle (40) on the road (30); a vibration information acquiring unit (21) configured to receive an optical signal from the optical fiber (10) and acquire, from the optical signal, vibration information indicating the vibration; a history information acquiring unit (22) configured to acquire history information indicating a travel history of the vehicle (40); and a laid state identifying unit (23) configured to identify a laid state of the optical fiber (10) based on a change over time in the history information and a change over time in the vibration information.

18 Claims, 9 Drawing Sheets

| DISTANCE, ALONG OPTICAL FIBER, FROM VIBRATION INFORMATION ACQUIRING UNIT | LATITUDE, LONGITUDE |
|---|---|
| *** [m] | x*, y* |
| *** [m] | x*, y* |
| ⋮ | ⋮ |

LAID STATE IDENTIFYING SYSTEM, LAID STATE IDENTIFYING APPARATUS, AND LAID STATE IDENTIFYING METHOD

This application is a National Stage Entry of PCT/JP2021/018204 filed on May 13, 2021, the contents of all of which are incorporated herein by reference, in their entirety.

TECHNICAL FIELD

The present disclosure relates to laid state identifying systems, laid state identifying apparatuses, and laid state identifying methods.

BACKGROUND ART

One of the characteristics of optical fiber sensing is that an optical fiber can detect vibration or the like corresponding to an event that has occurred around the optical fiber and, based on the detected vibration or the like, a sensing device (e.g., distributed fiber optical sensor (DFOS)), for example, can detect the event that has occurred.

However, although optical fiber sensing allows for identifying the distance, along an optical fiber, from a sensing device to the location where the optical fiber has detected vibration or the like, it does not allow for identifying the position on a map where the optical fiber has detected the vibration or the like. This creates a situation in which, while the fact that an event has occurred can be detected by optical fiber sensing, the position on a map where the event has occurred cannot be identified. Thus, the need arises that the laid state of an optical fiber be identified.

In this regard, a technique has recently been proposed for identifying the laid state of an optical fiber.

For example, Patent Literature 1 describes a technique of spatially calibrating a position along an optical fiber and a position within a geographical area.

Specifically, according to the technique described in Patent Literature 1, a calibration acoustic signal is generated at each of successive pit locations, and the coordinates of latitude and longitude are acquired at successive cable pits. Meanwhile, an optical fluctuation corresponding to a calibration acoustic signal is detected with an optical fiber. Then, the aforementioned spatial calibration is performed with the use of the position within the geographical area and the position, along the optical fiber, where the optical fluctuation has been detected.

CITATION LIST

Patent Literature

Patent Literature 1: Published Japanese Translation of PCT International Publication for Patent Application, No. 2019-529952

SUMMARY OF INVENTION

Technical Problem

The technique described in Patent Literature 1, however, has a problem in that a specific signal called a calibration acoustic signal needs to be generated at each of successive pit positions in order to identify the laid state of an optical fiber.

Accordingly, to solve the problem above, the present disclosure is directed to providing a laid state identifying system, a laid state identifying apparatus, and a laid state identifying method that each make it possible to identify the laid state of an optical fiber without generating any specific signals.

Solution to Problem

A laid state identifying system according to one aspect includes:

an optical fiber laid in a road and configured to detect vibration generated by traveling of a vehicle on the road;

a vibration information acquiring unit configured to receive an optical signal from the optical fiber and acquire, from the optical signal, vibration information indicating the vibration;

a history information acquiring unit configured to acquire history information indicating a travel history of the vehicle; and a laid state identifying unit configured to identify a laid state of the optical fiber based on a change over time in the history information and a change over time in the vibration information.

A laid state identifying apparatus according to one aspect includes:

a vibration information acquiring unit configured to receive an optical signal from an optical fiber laid in a road and configured to detect vibration generated by traveling of a vehicle on the road, and acquire, from the optical signal, vibration information indicating the vibration;

a history information acquiring unit configured to acquire history information indicating a travel history of the vehicle; and a laid state identifying unit configured to identify a laid state of the optical fiber based on a change over time in the history information and a change over time in the vibration information.

A laid state identifying method according to one aspect is a laid state identifying method to be performed by a laid state identifying apparatus, and the laid state identifying method includes:

a vibration information acquiring step of receiving an optical signal from an optical fiber laid in a road and configured to detect vibration generated by traveling of a vehicle on the road, and acquiring, from the optical signal, vibration information indicating the vibration;

a history information acquiring step of acquiring history information indicating a travel history of the vehicle; and a laid state identifying step of identifying a laid state of the optical fiber based on a change over time in the history information and a change over time in the vibration information.

Advantageous Effects of Invention

The aspects above provide advantageous effects of being able to obtain a laid state identifying system, a laid state identifying apparatus, and a laid state identifying method that each make it possible to identify the laid state of an optical fiber without generating any specific signals.

EXAMPLE EMBODIMENT

Figure 1:
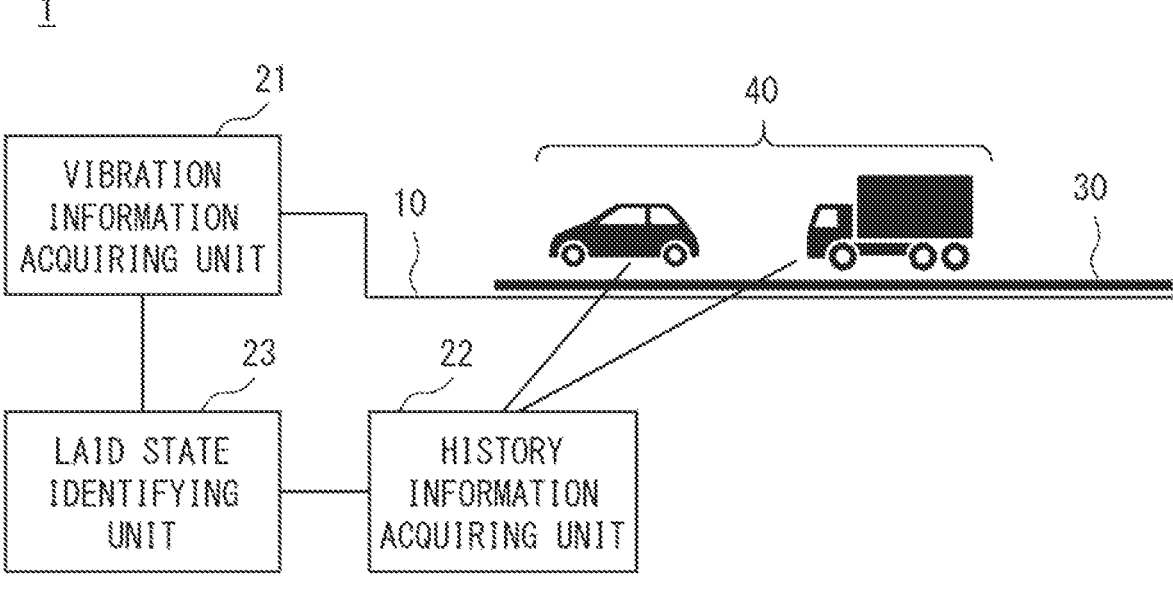
FIG. 1 shows an example of a configuration of a laid state identifying system according to a first example embodiment.

Hereinafter, some example embodiments of the present disclosure will be described with reference to the drawings. In the following description and drawings, omissions and simplifications are made as appropriate to make the description clearer. In the drawings, identical elements are given identical reference characters, and their repetitive description will be omitted as necessary.

First Example Embodiment

First, an example of a configuration of a laid state identifying system 1 according to a first example embodiment will be described with reference to FIG. 1. As shown in FIG. 1, the laid state identifying system 1 according to the first example embodiment includes an optical fiber 10, a vibration information acquiring unit 21, a history information acquiring unit 22, and a laid state identifying unit 23. Of these, the vibration information acquiring unit 21 is connected to the optical fiber 10 and provided in the form of an apparatus, as will be described later. Meanwhile, the history information acquiring unit 22 and the laid state identifying unit 23 may be provided in the form of an apparatus or provided on the cloud.

The optical fiber 10 is buried under a road 30. Herein, it suffices that the optical fiber 10 be laid in or on the road 30, and the method of laying the optical fiber 10 is not limited to the one shown in FIG. 1. For example, the optical fiber may be laid aerially over structures, such as utility poles, installed along the road 30. The optical fiber 10 may be an existing optical fiber for communication or may be an optical fiber newly installed for sensing.

One end of the optical fiber 10 is connected to the vibration information acquiring unit 21.

The vibration information acquiring unit 21 inputs pulsed light into the optical fiber 10. The vibration information acquiring unit 21 also receives from the optical fiber 10 backscattering light, as an optical signal, generated as pulsed light travels through the optical fiber 10.

When a vehicle 40 travels on the road 30, vibration is generated, and as this vibration is transmitted to the optical fiber 10, a characteristic (e.g., wavelength) of an optical signal being transmitted in the optical fiber 10 changes. Therefore, the optical fiber 10 can detect the vibration generated by the traveling of the vehicle 40 on the road 30, and an optical signal received from the optical fiber 10 includes vibration information indicating the vibration that the optical fiber 10 has detected. The history information acquiring unit 22 thus acquires the vibration information from the optical signal received from the optical fiber 10.

Meanwhile, the time difference between the time at which pulsed light is input to the optical fiber 10 and the time at which the optical signal is received from the optical fiber 10 corresponds to the detection position at which the vibration is detected by the optical fiber 10 (the distance, along the optical fiber 10, from the vibration information acquiring unit 21).

Therefore, the vibration information acquired by the history information acquiring unit 22 also includes information regarding the detection position of the vibration generated by the traveling of the vehicle 40 on the road 30 (the distance, along the optical fiber 10, from the vibration information acquiring unit 21).

The history information acquiring unit 22 acquires, from the vehicle 40 traveling on the road 30, history information indicating a travel history of the vehicle 40. The travel history of the vehicle 40 may be acquired by, for example, a global positioning system (GPS) system provided in the vehicle 40. The history information may include, for example, information such as absolute time, a traveling location (latitude and longitude), or a travel distance. The history information acquiring unit 22 may acquire the history information in real time or may, at a desired timing, acquire the history information stored tentatively in the vehicle 40.

The laid state identifying unit 23 identifies the laid state of the optical fiber 10 based on a change over time in the vibration information indicating vibration generated by the traveling of the vehicle 40 on the road 30 and a change over time in the history information indicating the travel history of that vehicle 40.

If the history information includes information regarding the history of a traveling location of the vehicle 40, the laid state identifying unit 23 may link the traveling location (latitude and longitude) of the vehicle 40 to the detection position of vibration generated by the traveling of that vehicle 40 (the distance, along the optical fiber 10, from the vibration information acquiring unit 21). This allows the laid state identifying unit 23 to link the distance, along the optical fiber 10, from the vibration information acquiring unit 21 to the latitude and longitude, which in turn makes it possible to identify the laid state of the optical fiber 10.

Vehicles 40 that travel on the road 30 include not only the vehicle 40 whose history information has been acquired but also a plurality of vehicles 40. Therefore, vibration information acquired by the history information acquiring unit 22 includes vibration information of each of a plurality of vehicles 40 that travel on the road 30.

The laid state identifying unit 23 thus needs to find, from among the pieces of vibration information of the plurality of vehicles 40, the vibration information of the vehicle 40 whose history information has been acquired.

Therefore, if the history information includes information regarding the history of a travel distance of the vehicle 40, the laid state identifying unit 23 performs pattern matching between the shape of a graph (first graph) corresponding to the history of the travel distance of the vehicle 40 and the shape of a graph (second graph) corresponding to the vibration information. Through this pattern matching, the laid state identifying unit 23 finds the vibration information of the vehicle 40 whose history information has been acquired and links the traveling location (latitude and longitude) of that vehicle 40 to the detection position of the vibration generated by the traveling of that vehicle 40 (the distance, along the optical fiber 10, from the vibration information acquiring unit 21).

Specific examples of pattern matching will be described below.

(1) Specific Example 1 of Pattern Matching

First, specific example 1 of pattern matching will be described with reference to FIG. 2.

Figure 2:
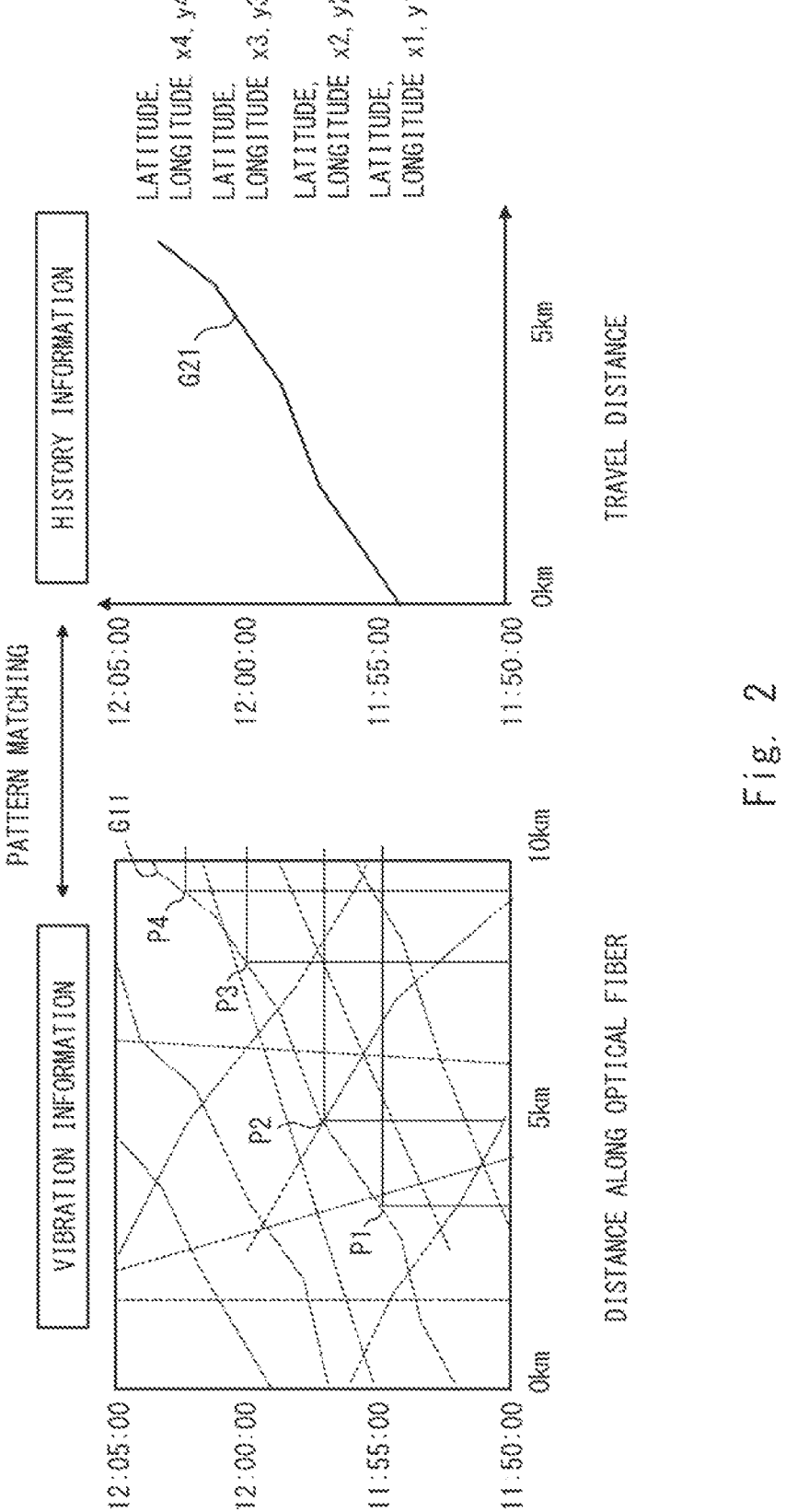
FIG. 2 shows specific example 1 of pattern matching that a laid state identifying unit performs according to the first example embodiment.

The drawing on the left in FIG. 2 shows an example of a graph corresponding to vibration information.

The drawing on the left in FIG. 2 shows a graph corresponding to vibration information of the vibration that the optical fiber 10 has detected in the road 30. The horizontal axis represents the distance, along the optical fiber 10, from the vibration information acquiring unit 21, and the vertical axis represents the time passing. The data shown becomes older in the forward direction along the vertical axis.

In the drawing on the left in FIG. 2, upon the optical fiber 10 detecting vibration associated with a vehicle 40 traveling on the road 30, the fact that the vehicle 40 is traveling is indicated by a graph composed of a single dotted line. For example, the fact that a single vehicle 40 is traveling along with the time passing is indicated by a graph composed of a single, oblique dotted line. In this case, the absolute value of the slope of the graph represents the traveling speed of the vehicle 40. What this means is that the traveling speed of the vehicle 40 is higher as the absolute value of the slope of the graph is smaller. The positive or negative slope of a graph represents the traveling direction of a vehicle 40. For example, when a graph having a positive slope represents a vehicle 40 traveling in a lane A, a graph having a negative slope represents a vehicle 40 traveling in a lane B in a direction opposite the direction of the lane A.

The drawing on the left in FIG. 2 includes a plurality of graphs each composed of an oblique dotted line. This shows that the drawing on the left in FIG. 2 indicates that a plurality of vehicles 40 are observed traveling on the road 30.

Meanwhile, the drawing on the right in FIG. 2 shows an example of a graph corresponding to history information.

The drawing on the right in FIG. 2 shows a graph corresponding to history information indicating a travel history of a certain vehicle 40. The horizontal axis represents the travel distance of the vehicle 40, and the vertical axis represents the time passing. The data shown becomes older in the forward direction along the vertical axis.

Figure 3:
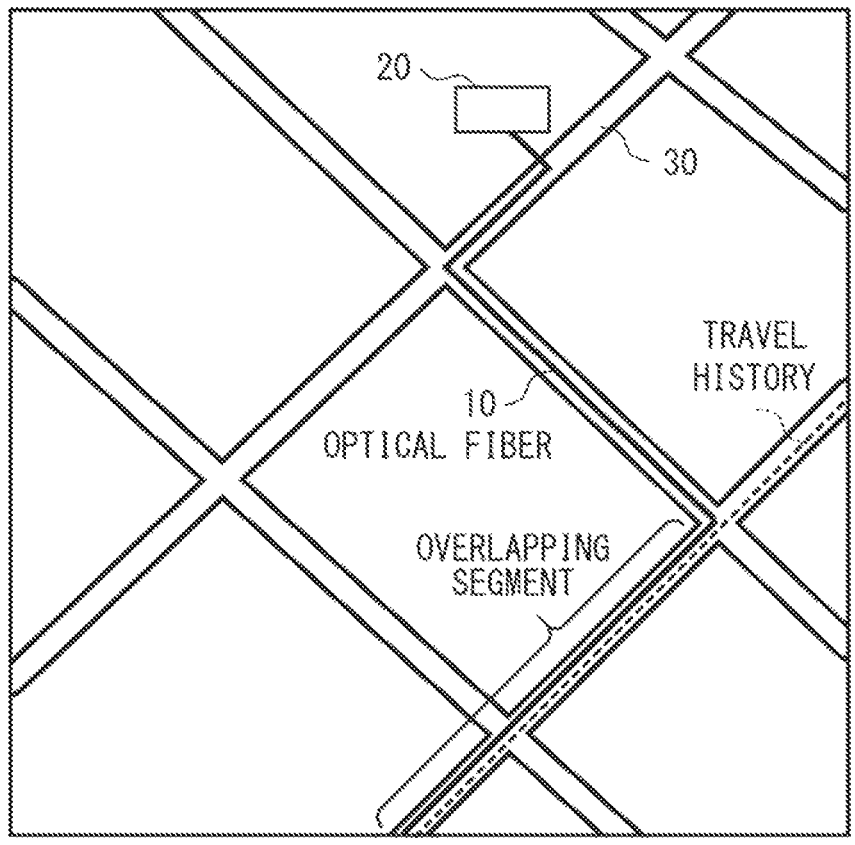
FIG. 3 shows an example of a laid state of an optical fiber and a travel history of a vehicle.

For example, FIG. 2 shows, in an overlapping segment in which a segment in which the optical fiber 10 is laid overlaps a segment that the vehicle 40 has traveled, as shown in FIG. 3, vibration information (the drawing on the left) of the vibration that the optical fiber 10 has detected as well as history information (the drawing on the right) of the travel history resulting from when the vehicle 40 has traveled the overlapping segment.

The laid state identifying unit 23, using the time as a reference, searches for a graph having a shape that matches the shape of a graph G21 corresponding to the history information in the drawing on the right in FIG. 2 from among the graphs corresponding to vibration information in the drawing on the left in FIG. 2.

Specifically, the laid state identifying unit 23 searches for such a graph in which the distance along the optical fiber 10 matches the travel distance of the graph G21 at the same time point.

In the example shown in FIG. 2, in a graph G11 in the drawing on the left in FIG. 2, the distance along the optical fiber 10 matches the travel distance of the graph G21 at four points P1 to P4.

Therefore, the laid state identifying unit 23 determines that the graph G11 has a shape that matches the shape of the graph G21. The laid state identifying unit 23 then links the distances along the optical fiber 10 at the four points P1 to P4 on the graph G11 to the traveling locations (latitude and longitude (x1,y1) to (x4,y4)) corresponding to the graph G21.

(2) Specific Example 2 of Pattern Matching

Figure 4:
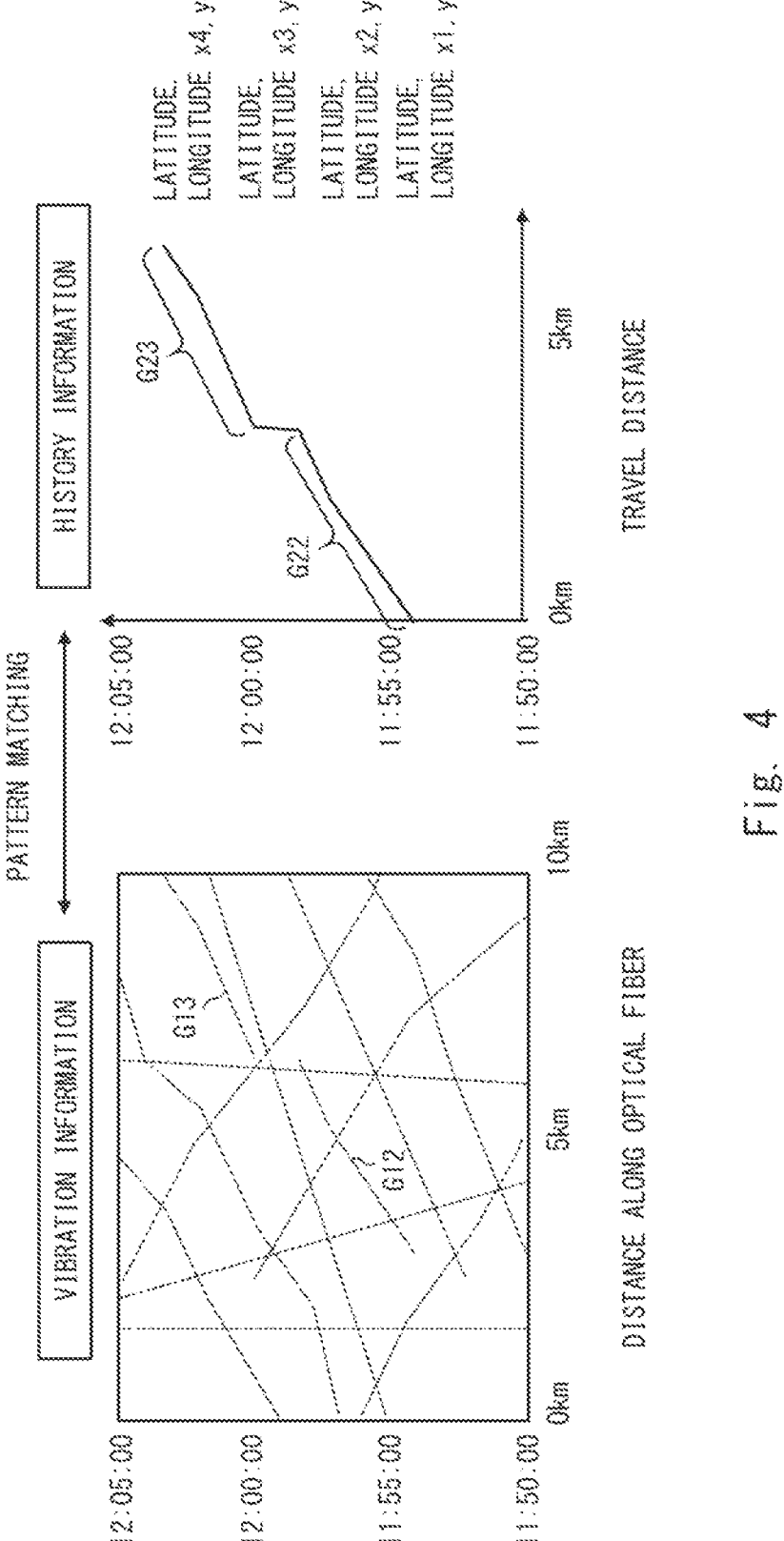
FIG. 4 shows specific example 2 of pattern matching that the laid state identifying unit performs according to the first example embodiment.

Next, specific example 2 of pattern matching will be described with reference to FIG. 4. Herein, as with the drawing on the left in FIG. 2, the drawing on the left in FIG. 4 shows an example of a graph corresponding to vibration information, and as with the drawing on the right in FIG. 2, the drawing on the right in FIG. 4 shows an example of a graph corresponding to history information. Furthermore, the horizontal axis and the vertical axis in each of the drawing on the left and the drawing on the right in FIG. 4 represent the same as those of the drawing on the left and the drawing on the right in FIG. 2.

This specific example 2 is an example that includes a segment in which a vehicle 40 is stopped.

As shown in the drawing on the right in FIG. 4, the travel distance does not change in the segment in which the vehicle 40 is stopped. Therefore, the laid state identifying unit 23 divides the shape of a graph corresponding to history information indicating the travel history of the vehicle 40 into a segment before the segment in which the vehicle 40 is stopped and a segment after the segment in which the vehicle 40 is stopped. Thus, the graph is divided into a graph G22 preceding the segment in which the vehicle 40 is stopped and a graph G23 following the segment in which the vehicle 40 is stopped.

For each of the divided graphs G22 and G23, the laid state identifying unit 23 searches for a graph having a shape matching the shape of the graph from among the graphs corresponding to vibration information in the drawing on the left in FIG. 4.

In the example shown in FIG. 4, the laid state identifying unit 23 determines that a graph G12 has a shape matching the shape of the graph G22 and determines that a graph G13 has a shape matching the shape of the graph G23. In this manner, even though the graphs G12 and G13 represent vibration information of the same vehicle 40, the graphs G12 and G13 are separated from each other since no vibration is detected in the segment in which the vehicle 40 is stopped.

Thereafter, as in the specific example 1 described above, the laid state identifying unit 23 links the distance along the optical fiber 10 in the graph G12 to the traveling location (latitude and longitude) corresponding to the graph G22 and links the distance along the optical fiber 10 in the graph G13 to the traveling location (latitude and longitude) corresponding to the graph G23.

(3) Specific Example 3 of Pattern Matching

Figure 5:
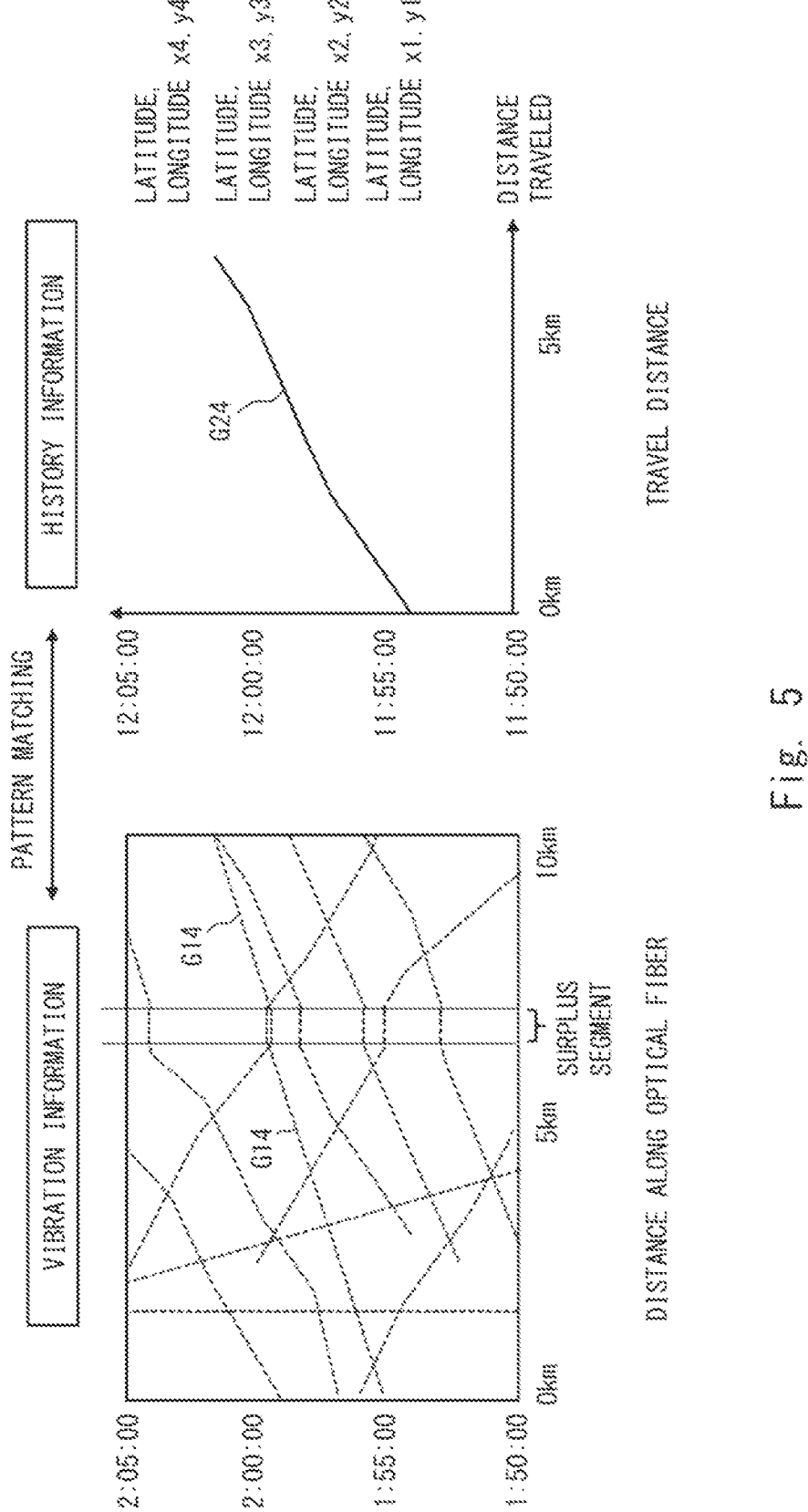
FIG. 5 shows specific example 3 of pattern matching that the laid state identifying unit performs according to the first example embodiment.

Next, specific example 3 of pattern matching will be described with reference to FIG. 5. Herein, as with the drawing on the left in FIG. 2, the drawing on the left in FIG. 5 shows an example of a graph corresponding to vibration information, and as with the drawing on the right in FIG. 2, the drawing on the right in FIG. 5 shows an example of a graph corresponding to history information. Furthermore, the horizontal axis and the vertical axis in each of the drawing on the left and the drawing on the right in FIG. 5 represent the same as those of the drawing on the left and the drawing on the right in FIG. 2.

This specific example 3 is an example that includes a surplus segment in which there is a surplus of the optical fiber 10.

Figure 6:
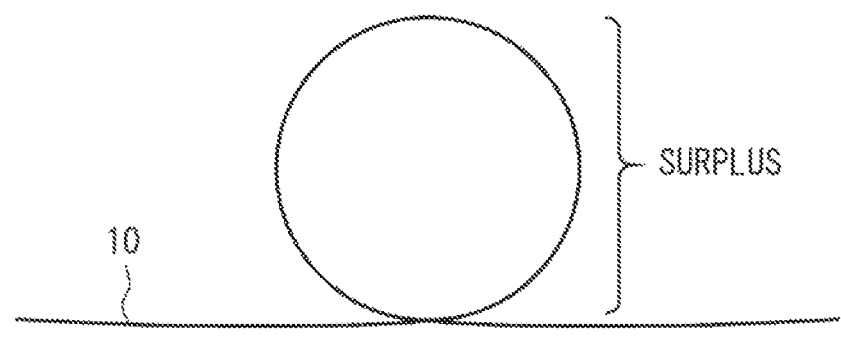
FIG. 6 shows an example of a surplus segment of an optical fiber.

As shown in FIG. 6, when the optical fiber 10 is laid, a surplus segment may arise in which there is a surplus of the optical fiber 10.

As shown in the drawing on the left in FIG. 5, in the surplus segment of the optical fiber 10, although the distance, along the optical fiber 10, from the vibration information acquiring unit 21 varies, the physical installation position of the optical fiber 10 is substantially the same, and thus vibration to be detected is also substantially the same.

Therefore, the laid state identifying unit 23 removes the shape of the surplus segment of the optical fiber 10 from the shape of each graph corresponding to vibration information of the vibration that the optical fiber 10 has detected in the road 30.

Then, for a graph G24 corresponding to the history information indicating the travel history of the vehicle 40, the laid state identifying unit 23 searches for a graph having a shape matching the shape of the graph G24 from among the graphs that correspond to vibration information in the drawing on the left in FIG. 5 and from which the shape of the surplus segment has been removed.

In the example shown in FIG. 5, the laid state identifying unit 23 determines that a graph resulting from removing the shape of the surplus segment from the shape of a graph G14 has a shape matching the shape of the graph G24.

Thereafter, as in the specific example 1 described above, the laid state identifying unit 23 links the distance along the optical fiber 10 in the graph resulting from removing the shape of the surplus segment from the shape of the graph G14 to the traveling location (latitude and longitude) corresponding to the graph G24.

Next, an example of a flow of operation of the laid state identifying system 1 according to the first example embodiment will be described with reference to FIG. 7.

Figure 7:
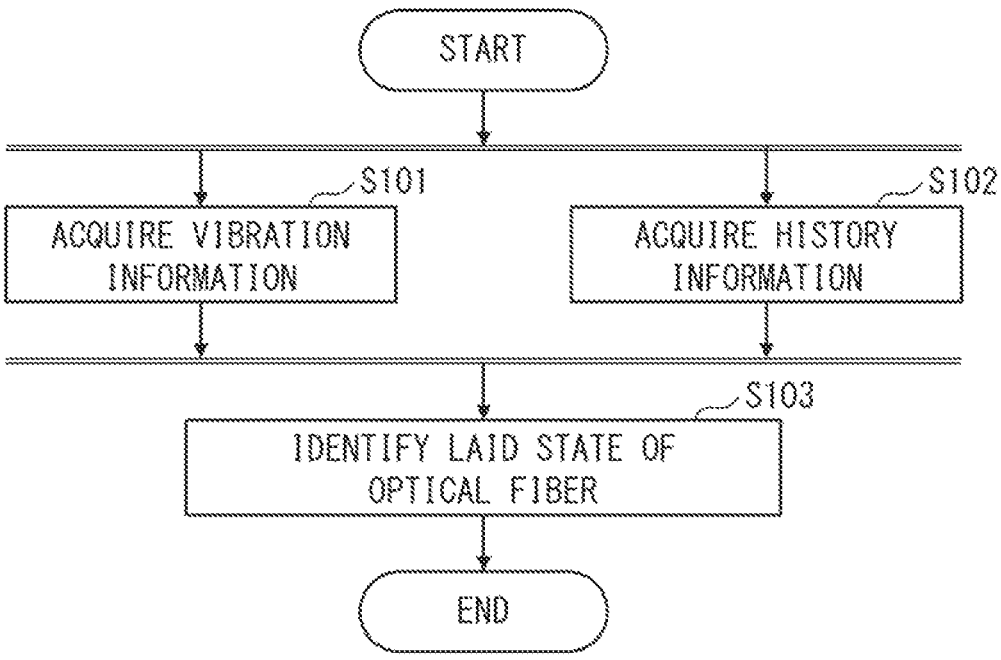
FIG. 7 is a flowchart showing an example of a flow of operation of the laid state identifying system according to the first example embodiment.

As shown in FIG. 7, the vibration information acquiring unit 21 receives an optical signal from the optical fiber 10. The vibration information acquiring unit 21 then acquires, from the optical signal, vibration information indicating vibration generated by the traveling of a vehicle 40 on the road 30 and detected by the optical fiber 10 (step S101).

Meanwhile, the history information acquiring unit 22 acquires, from the vehicle 40 traveling on the road 30, history information indicating the travel history of the vehicle 40 (step S102).

Thereafter, the laid state identifying unit 23 identifies the laid state of the optical fiber 10 based on a change over time in the vibration information indicating the vibration generated by the traveling of the vehicle 40 on the road and a change over time in the history information indicating the travel history of that vehicle 40 (step S103).

Although the operations at steps S101 and S102 are performed in parallel according to FIG. 7, this is not a limiting example. For example, the operation at step S102 may be performed after the operation at step S101, or the operation at step S101 may be performed after the operation at step S102.

As described above, according to the first example embodiment, the vibration information acquiring unit 21 acquires vibration information indicating vibration generated by the traveling of a vehicle 40 on the road 30 and detected by the optical fiber 10. The history information acquiring unit 22 acquires, from the vehicle 40 traveling on the road 30, history information indicating the travel history of the vehicle 40. The laid state identifying unit 23 identifies the laid state of the optical fiber 10 based on a change over time in the vibration information indicating the vibration generated by the traveling of the vehicle 40 on the road 30 and a change over time in the history information indicating the travel history of that vehicle 40.

Thus, the laid state of the optical fiber 10 can be identified without generating any specific signals as in the technique described in Patent Literature 1.

Furthermore, since the laid state of the optical fiber 10 can be identified, a location where an anomaly has occurred can be attended to without delay in response to the anomaly being detected by optical fiber sensing. The optical fiber sensing also makes it possible to detect an event that has occurred at a specific location.

Meanwhile, any vehicle whose travel history can be acquired can be used as a vehicle 40. For example, in a case of a vehicle 40 that performs a specific work (e.g., transporting work, construction work, etc.), either of a travel history during that specific work and a travel history during another work can be used.

Second Example Embodiment

Figures 8, 9:
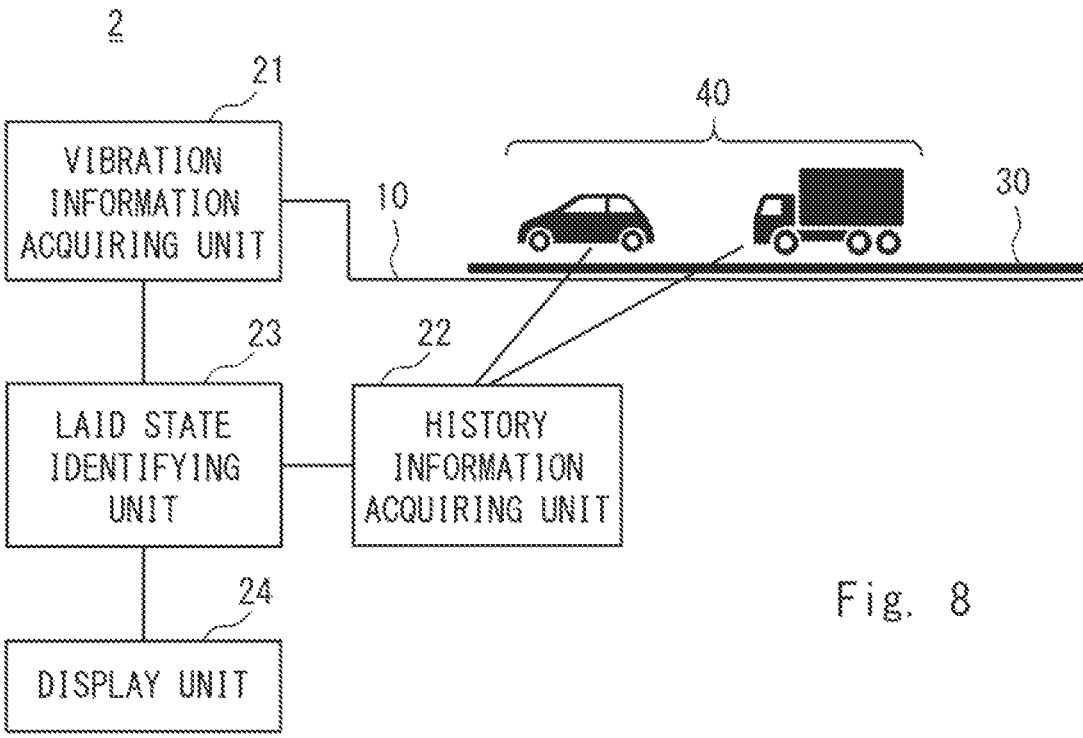
FIG. 8 shows an example of a configuration of a laid state identifying system according to a second example embodiment.
FIG. 9 shows an example of a GUI screen that a display unit displays according to the second example embodiment.

First, an example of a configuration of a laid state identifying system 2 according to a second example embodiment will be described with reference to FIG. 8. As shown in FIG. 8, the laid state identifying system 2 differs from the laid state identifying system 1 according to the first example embodiment described above in that a display unit 24 is added.

The display unit 24 displays the laid state of the optical fiber 10 identified by the laid state identifying unit 23. For example, as shown in FIG. 9, the display unit 24 displays, on a graphical user interface (GUI) screen implemented in the form of a table, results from linking the distance, along the optical fiber 10, from the vibration information acquiring unit 21 to the latitude and longitude.

Next, an example of a flow of operation of the laid state identifying system 2 according to the second example embodiment will be described with reference to FIG. 10.

Figure 10:
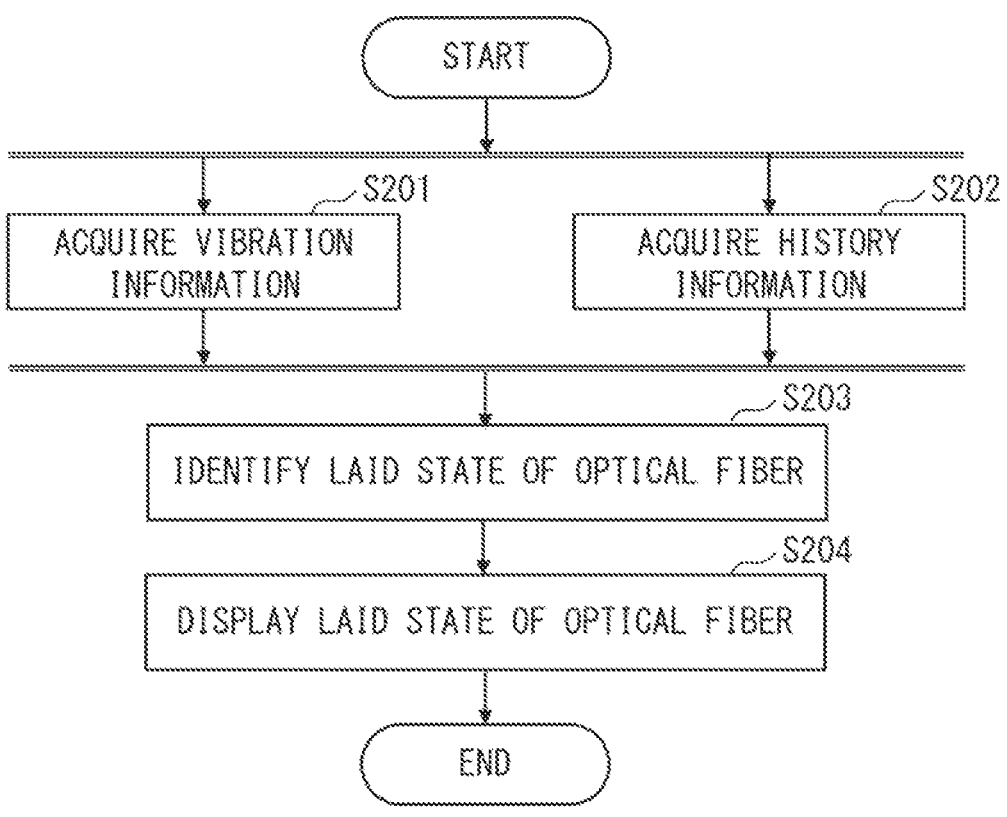
FIG. 10 is a flowchart showing an example of a flow of operation of the laid state identifying system according to the second example embodiment.

As shown in FIG. 10, first, steps S201 to S203 similar to steps S101 to S103 of FIG. 7 are performed. As a result, the laid state of the optical fiber 10 is identified by the laid state identifying unit 23.

Thereafter, the display unit 24 displays the laid state of the optical fiber identified by the laid state identifying unit 23 (step S204). At this point, the display unit 24 may display a GUI screen such as the one shown in FIG. 9.

As described above, according to the second example embodiment, the display unit 24 displays the laid state of the optical fiber 10 identified by the laid state identifying unit 23. This makes it possible to provide information regarding the laid state of the optical fiber 10, for example, to a monitoring center or monitoring personnel monitoring a specific location through optical fiber sensing or to a user using the results of the optical fiber sensing. Other advantageous effects are similar to those provided by the first example embodiment described above.

Other Example Embodiments

In the first example embodiment described above, the vibration information acquiring unit 21, the history information acquiring unit 22, and the laid state identifying unit 23 are provided separate from each other. Alternatively, these constituent elements may be integrated in a single apparatus.

Figure 11:
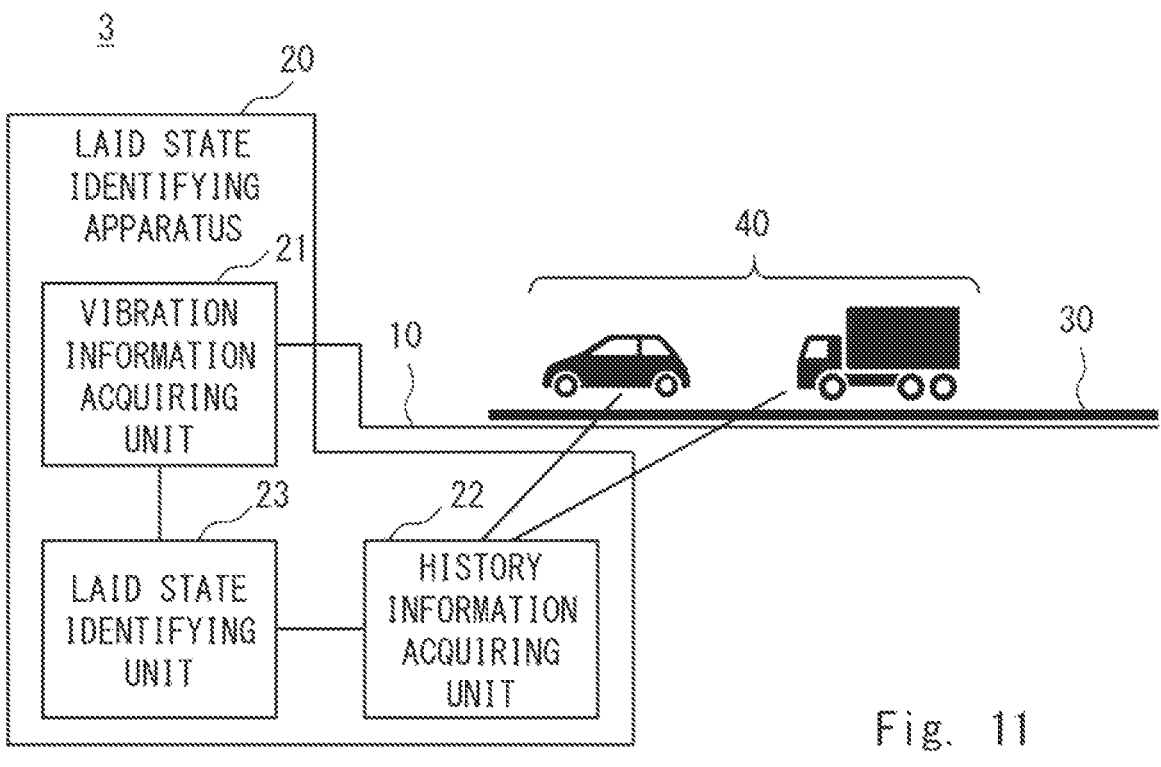
FIG. 11 shows an example of a configuration of a laid state identifying system according to another example embodiment.

FIG. 11 shows an example of a configuration of a laid state identifying system 3 according to another example embodiment. This laid state identifying system 3 includes an optical fiber 10 and a laid state identifying apparatus 20, and a vibration information acquiring unit 21, a history information acquiring unit 22, and a laid state identifying unit 23 are provided in the laid state identifying apparatus 20. Herein, the laid state identifying apparatus 20 may include the display unit 24 according to the second example embodiment described above.

<Hardware Configuration of Laid State Identifying Apparatus According to Example Embodiment>

Next, an example of a hardware configuration of a computer 50 that implements the laid state identifying apparatus 20 according to the other example embodiment described above will be illustrated with reference to FIG. 12.

Figure 12:
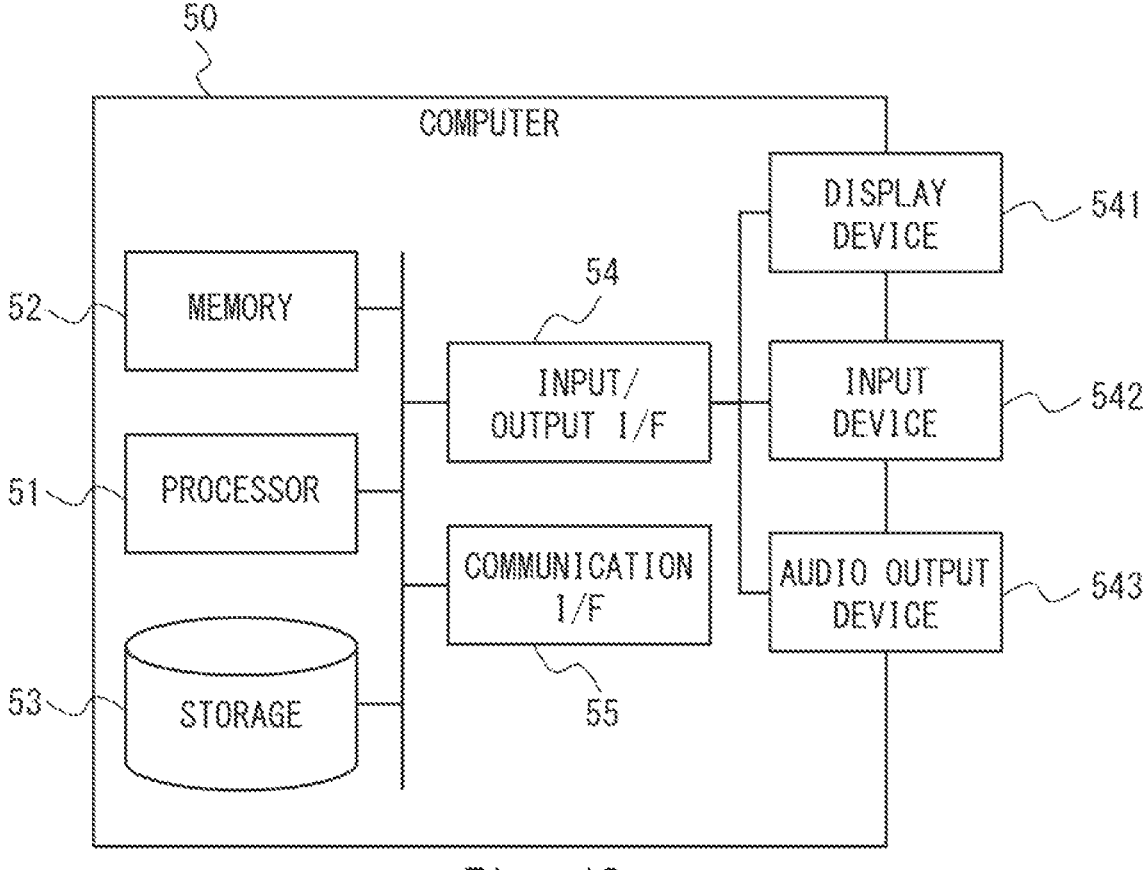
FIG. 12 is a block diagram showing an example of a hardware configuration of a computer that implements a laid state identifying apparatus according to the other example embodiment.

As shown in FIG. 12, the computer 50 includes, for example but not limited to, a processor 51, a memory 52, a storage 53, an input/output interface (input/output I/F) 54, and a communication interface (communication I/F) 55. The processor 51, the memory 52, the storage 53, the input/output interface 54, and the communication interface 55 are connected by a data transmission line for transmitting and receiving data to and from each other.

The processor 51 is, for example, an arithmetic operation processing device, such as a central processing unit (CPU) or a graphics processing unit (GPU). The memory 52 is, for example, a memory, such as a random-access memory (RAM) or a read-only memory (ROM). The storage 53 is, for example, a storage device, such as a hard-disk drive (HDD), a solid-state drive (SSD), or a memory card. The storage 53 may also be a memory, such as a RAM or a ROM.

The storage 53 stores programs that implement the functions of the constituent elements of the laid state identifying apparatus 20. The processor 51, by executing these programs, implements each of the functions of the constituent elements of the laid state identifying apparatus 20. When the processor 51 executes the above programs, the processor 51 may execute the programs upon loading them onto the memory 52 or execute the programs without loading them onto the memory 52. The memory 52 or the storage 53 also serves to store information or data that the constituent elements of the laid state identifying apparatus 20 hold.

The programs described above include a set of instructions (or software codes) that, when loaded onto a computer, causes the computer to execute one or more functions described according to the foregoing example embodiments. The programs may be stored in a non-transitory computer-readable medium or in a tangible storage medium. Some non-limiting examples of a computer-readable medium or of a tangible storage medium include a random-access memory (RAM), a read-only memory (ROM), a flash memory, a solid-state drive (SSD), or other memory technologies: a CD-ROM, a digital versatile disc (DVD), a Blu-ray (registered trademark) disc, or other optical disc storages: or a magnetic cassette, a magnetic tape, a magnetic disk storage, or other magnetic storage devices. The programs may be transmitted via a transitory computer-readable medium or via a communications medium. Some non-limiting examples of a transitory computer-readable medium or of a communications medium include an electrical, optical, or acoustic propagation signal or a propagation signal of any other form.

The input/output interface 54 is connected to, for example but not limited to, a display device 541, an input device 542, and an audio output device 543. The display device 541 is a device, such as a liquid-crystal display (LCD), a cathode-ray tube (CRT) display, or a monitor, that displays a screen corresponding to rendering data processed by the processor 51. The input device 542 is a device that receives an operator's operation input. The input device 542 is, for example but not limited to, a keyboard, a mouse, or a touch sensor. The display device 541 and the input device 542 may be integrated and implemented in the form of a touch panel. The audio output device 543 is a device, such as a loudspeaker, that audibly outputs a sound corresponding to audio data processed by the processor 51.

The communication interface 55 transmits and receives data to and from an external device. For example, the communication interface 55 communicates with an external device via a wired communication line or a wireless communication line.

Thus far, the present disclosure has been described with reference to some example embodiments, but the present disclosure is not limited by the example embodiments described above. Various modifications that a person skilled in the art can appreciate can be made to the configuration and details of the present disclosure within the scope of the present disclosure.

Part or the whole of the foregoing example embodiments can also be expressed as in the following supplementary notes, which are not limiting.

(Supplementary Note 1)

A laid state identifying system comprising:

an optical fiber laid in a road and configured to detect vibration generated by traveling of a vehicle on the road;

a vibration information acquiring unit configured to receive an optical signal from the optical fiber and acquire, from the optical signal, vibration information indicating the vibration;

a history information acquiring unit configured to acquire history information indicating a travel history of the vehicle; and a laid state identifying unit configured to identify a laid state of the optical fiber based on a change over time in the history information and a change over time in the vibration information.

(Supplementary Note 2)

The laid state identifying system according to Supplementary Note 1, wherein the history information includes a history of a traveling location of the vehicle, and the laid state identifying unit is configured to identify the laid state by linking a detection position of the vibration by the optical fiber to a traveling location of the vehicle included in the history information.

(Supplementary Note 3)

The laid state identifying system according to Supplementary Note 2, wherein the history information includes a history of a travel distance of the vehicle, and the laid state identifying unit is configured to link the detection position of the vibration to the traveling location of the vehicle by performing pattern matching between a shape of a first graph and a shape of a second graph, the first graph being a graph corresponding to the history of the travel distance, the second graph being a graph corresponding to the vibration information.

(Supplementary Note 4)

The laid state identifying system according to Supplementary Note 3, wherein the laid state identifying unit is configured to, if there is a stopped segment in which the vehicle is stopped, link the detection position of the vibration to the traveling location of the vehicle by dividing the shape of the first graph into a shape of a segment before the stopped segment and a shape of a segment after the stopped segment and by performing pattern matching between the shape of each of the divided segments and the shape of the second graph.

(Supplementary Note 5)

The laid state identifying system according to Supplementary Note 3, wherein the laid state identifying unit is configured to, if there is a surplus segment in which the optical fiber has a surplus, link the detection position of the vibration to the traveling location of the vehicle by performing pattern matching between the shape of the first graph and a shape resulting from removing a shape of the surplus segment from the shape of the second graph.

(Supplementary Note 6)

The laid state identifying system according to any one of Supplementary Notes 1 to 5, further comprising a display unit configured to display the laid state identified by the laid state identifying unit.

(Supplementary Note 7)

A laid state identifying apparatus comprising:

a vibration information acquiring unit configured to receive an optical signal from an optical fiber laid in a road and configured to detect vibration generated by traveling of a vehicle on the road, and acquire, from the optical signal, vibration information indicating the vibration;

a history information acquiring unit configured to acquire history information indicating a travel history of the vehicle; and a laid state identifying unit configured to identify a laid state of the optical fiber based on a change over time in the history information and a change over time in the vibration information.

(Supplementary Note 8)

The laid state identifying apparatus according to Supplementary Note 7, wherein the history information includes a history of a traveling location of the vehicle, and the laid state identifying unit is configured to identify the laid state by linking a detection position of the vibration by the optical fiber to a traveling location of the vehicle included in the history information.

(Supplementary Note 9)

The laid state identifying apparatus according to Supplementary Note 8, wherein the history information includes a history of a travel distance of the vehicle, and the laid state identifying unit is configured to link the detection position of the vibration to the traveling location of the vehicle by performing pattern matching between a shape of a first graph and a shape of a second graph, the first graph being a graph corresponding to the history of the travel distance, the second graph being a graph corresponding to the vibration information.

(Supplementary Note 10)

The laid state identifying apparatus according to Supplementary Note 9, wherein the laid state identifying unit is configured to, if there is a stopped segment in which the vehicle is stopped, link the detection position of the vibration to the traveling location of the vehicle by dividing the shape of the first graph into a shape of a segment before the stopped segment and a shape of a segment after the stopped segment and by performing pattern matching between the shape of each of the divided segments and the shape of the second graph.

(Supplementary Note 11)

The laid state identifying apparatus according to Supplementary Note 9, wherein the laid state identifying unit is configured to, if there is a surplus segment in which the optical fiber has a surplus, link the detection position of the vibration to the traveling location of the vehicle by performing pattern matching between the shape of the first graph and a shape resulting from removing a shape of the surplus segment from the shape of the second graph.

(Supplementary Note 12)

The laid state identifying apparatus according to any one of Supplementary Notes 7 to 11, further comprising a display unit configured to display the laid state identified by the laid state identifying unit.

(Supplementary Note 13)

A laid state identifying method to be performed by a laid state identifying apparatus, the laid state identifying method comprising:

a vibration information acquiring step of receiving an optical signal from an optical fiber laid in a road and configured to detect vibration generated by traveling of a vehicle on the road, and acquiring, from the optical signal, vibration information indicating the vibration;

a history information acquiring step of acquiring history information indicating a travel history of the vehicle; and a laid state identifying step of identifying a laid state of the optical fiber based on a change over time in the history information and a change over time in the vibration information.

(Supplementary Note 14)

The laid state identifying method according to Supplementary Note 13, wherein the history information includes a history of a traveling location of the vehicle, and the laid state identifying step includes identifying the laid state by linking a detection position of the vibration by the optical fiber to a traveling location of the vehicle included in the history information.

(Supplementary Note 15)

The laid state identifying method according to Supplementary Note 14, wherein the history information includes a history of a travel distance of the vehicle, and the laid state identifying step includes linking the detection position of the vibration to the traveling location of the vehicle by performing pattern matching between a shape of a first graph and a shape of a second graph, the first graph being a graph corresponding to the history of the travel distance, the second graph being a graph corresponding to the vibration information.

(Supplementary Note 16)

The laid state identifying method according to Supplementary Note 15, wherein the laid state identifying step includes, if there is a stopped segment in which the vehicle is stopped, linking the detection position of the vibration to the traveling location of the vehicle by dividing the shape of the first graph into a shape of a segment before the stopped segment and a shape of a segment after the stopped segment and by performing pattern matching between the shape of each of the divided segments and the shape of the second graph.

(Supplementary Note 17)

The laid state identifying method according to Supplementary Note 15, wherein the laid state identifying step includes, if there is a surplus segment in which the optical fiber has a surplus, linking the detection position of the vibration to the traveling location of the vehicle by performing pattern matching between the shape of the first graph and a shape resulting from removing a shape of the surplus segment from the shape of the second graph.

(Supplementary Note 18)

The laid state identifying method according to any one of Supplementary Notes 13 to 17, further comprising a display step of displaying the laid state identified by the laid state identifying step.

REFERENCE SIGNS LIST 1, 2, 3 LAID STATE IDENTIFYING SYSTEM
20 LAID STATE IDENTIFYING APPARATUS
21 VIBRATION INFORMATION ACQUIRING UNIT
22 HISTORY INFORMATION ACQUIRING UNIT
23 LAID STATE IDENTIFYING UNIT
24 DISPLAY UNIT
30 ROAD
40 VEHICLE
50 COMPUTER
51 PROCESSOR
52 MEMORY
53 STORAGE
54 INPUT/OUTPUT INTERFACE
541 DISPLAY DEVICE
542 INPUT DEVICE
543 AUDIO OUTPUT DEVICE
55 COMMUNICATION INTERFACE

What is claimed is:

1. A laid state identifying system comprising:
an optical fiber laid in a road and configured to detect a vibration generated by traveling of a vehicle on the road;
at least one memory storing instructions, and
at least one processor configured to execute the instructions to;
receive an optical signal from the optical fiber and acquire, from the optical signal, vibration information indicating the vibration;
acquire history information indicating a travel history of the vehicle; and
identify a laid state of the optical fiber based on a change over time in the history information and a change over time in the vibration information.

2. The laid state identifying system according to claim 1, wherein
the history information includes a history of a traveling location of the vehicle, and
the at least one processor is further configured to execute the instructions to identify the laid state by linking a detection position of the vibration by the optical fiber to a traveling location of the vehicle included in the history information.

3. The laid state identifying system according to claim 2, wherein
the history information includes a history of a travel distance of the vehicle, and
the at least one processor is further configured to execute the instructions to link the detection position of the vibration to the traveling location of the vehicle by performing pattern matching between a shape of a first graph and a shape of a second graph, the first graph being a graph corresponding to the history of the travel distance, the second graph being a graph corresponding to the vibration information.

4. The laid state identifying system according to claim 3, wherein the at least one processor is further configured to execute the instructions to, if there is a stopped segment in which the vehicle is stopped, link the detection position of the vibration to the traveling location of the vehicle by dividing the shape of the first graph into a shape of a segment before the stopped segment and a shape of a segment after the stopped segment and by performing pattern matching between the shape of each of the divided segments and the shape of the second graph.

5. The laid state identifying system according to claim 3, wherein the at least one processor is further configured to execute the instructions to, if there is a surplus segment in which the optical fiber has a surplus, link the detection position of the vibration to the traveling location of the vehicle by performing pattern matching between the shape of the first graph and a shape resulting from removing a shape of the surplus segment from the shape of the second graph.

6. The laid state identifying system according to claim 1, further comprising a display unit configured to display the identified laid state.

7. A laid state identifying apparatus comprising:
at least one memory storing instructions, and
at least one processor configured to execute the instructions to;
receive an optical signal from an optical fiber laid in a road and configured to detect vibration generated by traveling of a vehicle on the road, and acquire, from the optical signal, vibration information indicating the vibration;
acquire history information indicating a travel history of the vehicle; and
identify a laid state of the optical fiber based on a change over time in the history information and a change over time in the vibration information.

8. The laid state identifying apparatus according to claim 7, wherein
the history information includes a history of a traveling location of the vehicle, and
the at least one processor is further configured to execute the instructions to identify the laid state by linking a detection position of the vibration by the optical fiber to a traveling location of the vehicle included in the history information.

9. The laid state identifying apparatus according to claim 8, wherein
the history information includes a history of a travel distance of the vehicle, and
the at least one processor is further configured to execute the instructions to link the detection position of the vibration to the traveling location of the vehicle by performing pattern matching between a shape of a first graph and a shape of a second graph, the first graph being a graph corresponding to the history of the travel distance, the second graph being a graph corresponding to the vibration information.

10. The laid state identifying apparatus according to claim 9, wherein the at least one processor is further configured to execute the instructions to, if there is a stopped segment in which the vehicle is stopped, link the detection position of the vibration to the traveling location of the vehicle by dividing the shape of the first graph into a shape of a segment before the stopped segment and a shape of a segment after the stopped segment and by performing pattern matching between the shape of each of the divided segments and the shape of the second graph.

11. The laid state identifying apparatus according to claim 9, wherein the at least one processor is further configured to execute the instructions to, if there is a surplus segment in which the optical fiber has a surplus, link the detection position of the vibration to the traveling location of the vehicle by performing pattern matching between the shape of the first graph and a shape resulting from removing a shape of the surplus segment from the shape of the second graph.

12. The laid state identifying apparatus according to claim 7, further comprising a display unit configured to display the identified laid state.

13. A laid state identifying method to be performed by a laid state identifying apparatus, the laid state identifying method comprising:

a vibration information acquiring step of receiving an optical signal from an optical fiber laid in a road and configured to detect vibration generated by traveling of a vehicle on the road, and acquiring, from the optical signal, vibration information indicating the vibration;

a history information acquiring step of acquiring history information indicating a travel history of the vehicle; and a laid state identifying step of identifying a laid state of the optical fiber based on a change over time in the history information and a change over time in the vibration information.

14. The laid state identifying method according to claim 13, wherein the history information includes a history of a traveling location of the vehicle, and the laid state identifying step includes identifying the laid state by linking a detection position of the vibration by the optical fiber to a traveling location of the vehicle included in the history information.

15. The laid state identifying method according to claim 14, wherein the history information includes a history of a travel distance of the vehicle, and the laid state identifying step includes linking the detection position of the vibration to the traveling location of the vehicle by performing pattern matching between a shape of a first graph and a shape of a second graph, the first graph being a graph corresponding to the history of the travel distance, the second graph being a graph corresponding to the vibration information.

16. The laid state identifying method according to claim 15, wherein the laid state identifying step includes, if there is a stopped segment in which the vehicle is stopped, linking the detection position of the vibration to the traveling location of the vehicle by dividing the shape of the first graph into a shape of a segment before the stopped segment and a shape of a segment after the stopped segment and by performing pattern matching between the shape of each of the divided segments and the shape of the second graph.

17. The laid state identifying method according to claim 15, wherein the laid state identifying step includes, if there is a surplus segment in which the optical fiber has a surplus, linking the detection position of the vibration to the traveling location of the vehicle by performing pattern matching between the shape of the first graph and a shape resulting from removing a shape of the surplus segment from the shape of the second graph.

18. The laid state identifying method according to claim 13, further comprising a display step of displaying the laid state identified by the laid state identifying step.

*   *   *   *   *